2,786,034
Patented Mar. 19, 1957

2,786,034

CALCIUM-STRONTIUM PHOSPHATE PHOSPHORS

Keith H. Butler, Marblehead, Mass., assignor to Sylvania Electric Products Inc., Salem, Mass., a corporation of Massachusetts No Drawing. Application March 3, 1951,
Serial No. 213,803

2 Claims. (Cl. 252—301.4)

This invention relates to phosphors, and particularly to phosphate phosphors activated by tin.

One such phosphor is shown in my copending application, Serial No. 160,399, filed May 5, 1950, and now abandoned, wherein the color of luminescence of a calcium phosphate phosphor could be varied from blue to red by variation in the tin content and particularly in the amount of tin in the stannous state. The color of luminescence was determined by the sum of two broad emission bands, one at about 500 millimicrons wavelength in the blue-green and one at about 630 millimicrons in the red.

I now find that the blue-green band at 500 millimicrons can be diminished or suppressed by the replacement of some of the calcium by strontium, while the red band remains substantially the same, being shifted only slightly from 630 millimicrons to 620 millimicrons. At the same time a new band appears at about 400 millimicrons, just at the extreme end of the violet range.

Since the eye is not very sensitive to the latter wavelength, and since the blue-green luminescence is reduced, the principal color of visibile light emitted from the phosphor is from the 620 millimicron red band. Thus the addition of strontium to the phosphor shifts its color from a pinkish white to a deep orange red, a color difficult to obtain in phosphors.

The tin-activated calcium-strontium phosphates are substantially non-fluorescent when they have the stoichiometric ratio of three gram-atoms of calcium-plus-strontium to two gram moles of the phosphate radical. The luminescent red output is also poor when the ratio corresponds to the stoichiometric value for the pyrophosphate, two gram-atoms of calcium-plus strontium to two gram-moles of the phosphate radical. Between these two ratios there is a range of proportions within which very good red luminescence is obtained.

The amount of tin present in the phosphor should be between 0.002 and 0.20 gram-atom from each 2.00 gram-moles of the phosphate radical. To secure luminescence, at least part of the tin present must be in the stannous, as distinguished from stannic, state, and accordingly a slightly reducing atmosphere is necessary during the firing of the phosphor.

If the mixture of raw materials is fired in the presence of air, the powder obtained is white but susbtantially non-fluorescent and the tin is present wholly in the stannic state. If this powder is then refired in a very strongly reducing atmosphere, for example, an atmosphere having high hydrogen content, the powders are discolored gray, probably from metallic tin present in small amounts. If the reducing atmosphere is controlled, for example by adjusting the hydrogen content, the resulting powders are white and show excellent red fluorescence. I have found, however, that the hydrogen concentration becomes gradually more critical as the tin content is increased, due to tendencies to discoloration at high hydrogen concentrations and to low brightness at low hydrogen concentrations.

In addition the phosphor should have a crystal structure somewhat different from, but similar to, that of the low-temperature or beta form of calcium orthophosphate, and quite different from that of the high-temperature or alpha form of said orthophosphate. The presence of strontium in the crystal is found to inhibit the formation of the alpha form of the ortho-phosphate.

When preparing these phosphors, it is preferable in many cases to use secondary calcium phosphate ($CaHPO_4$) as the source of calcium and phosphate, and to use strontium carbonate as the source of strontium, with the tin being added as stannous oxide. With this combination of ingredients, the composition of a typical phosphor matrix is 2.0 gram atoms of calcium, 0.88 gram atom of strontium and 2.0 gram moles of phosphate. This particular mixture is close to the optimum for this new phosphor.

Table 1

| Gram Atoms per 2 Gram Moles $PO_4$ | | | Photometer Readings | | | |
|---|---|---|---|---|---|---|
| Calcium | Strontium | Tin | Viscor | Red | Green | Blue |
| 2.00 | .88 | .002 | 49 | 103 | 43 | 110 |
| 2.00 | .88 | .005 | 54 | 118 | 52 | 125 |
| 2.00 | .88 | .010 | 56 | 120 | 53 | 125 |
| 2.00 | .88 | .020 | 57 | 122 | 52 | 115 |
| 2.00 | .88 | .040 | 57 | 124 | 57 | 100 |
| 2.00 | .88 | .080 | 50 | 116 | 46 | 85 |
| 2.00 | 0.75 | .250 | 33 | 83 | 30 | 80 |

Table 1 shows that with this matrix composition, the tin content can be varied over a wide range. In preparing these phosphors, the blended components were prefired in air at 2200° F. and then refired at the same temperature in a mixture of nitrogen and hydrogen, the composition of the gas mixture being so chosen as to give the best output.

The photometer readings on these powders were made with a photovoltaic cell through filters and are expressed as percentage of the readings obtained with an arbitrary calcium halophosphate phosphor standard. The red, green and blue readings are those obtained using Wratten A, B, C tricolor filters, while the viscor filter is a combination which corrects the photocell sensitivity to approximate to the sensitivity of the normal eye.

Table 2

| Percent $H_2$ in Gas | Gram Atoms Per 2 Gram Moles $PO_4$ | | | Photometer Readings | | | |
|---|---|---|---|---|---|---|---|
| | Calcium | Strontium | Tin | Viscor | Red | Green | Blue |
| 0.14 | 2.00 | .88 | 0.002 | 9 | 12 | 8 | 40 |
| 0.28 | 2.00 | .88 | 0.002 | 40 | 85 | 36 | 100 |
| 0.56 | 2.00 | .88 | 0.002 | 45 | 97 | 43 | 110 |
| 1.40 | 2.00 | .88 | 0.002 | 47 | 98 | 44 | 115 |
| 2.80 | 2.00 | .88 | 0.002 | 49 | 103 | 43 | 110 |
| 7.20 | 2.00 | .88 | 0.002 | 46 | 103 | 45 | 110 |

Table 2 shows the effect of the reducing atmosphere for a phosphor containing 0.88 gram-atom of strontium and 0.002 gram-atom of tin. These phosphors were prefired in air at 2200° F. and refired in the reducing atmosphere at 2200° F. It will be noticed that there is a gradual improvement of the phosphor as the percentage of hydrogen is increased, but that the output is substantially constant over a wide range of hydrogen contents.

Table 3

| Percent $H_2$ in Gas | Gram Atoms Per 2 Gram Moles PO$_4$ | | | Photometer Readings | | | |
|---|---|---|---|---|---|---|---|
| | Calcium | Strontium | Tin | Viscor | Red | Green | Blue |
| 0.28 | 2.00 | 0.75 | 0.25 | 12 | 42 | 11 | 45 |
| 0.14 | 2.00 | 0.75 | 0.25 | 31 | 79 | 28 | 85 |
| 0.56 | 2.00 | 0.75 | 0.25 | 33 | 83 | 30 | 80 |
| 2.80 | 2.00 | 0.75 | 0.25 | 31 | 78 | 30 | 60 |

Table 3 shows similar effects for a phosphor containing 0.75 gram-atom of strontium and 0.25 gram-atom of tin. In this case, the allowable range of hydrogen concentrations is more limited. With very low hydrogen concentration the full brightness is not developed, while with high hydrogen concentrations the phosphor is discolored gray. With the very high tin content used in these phosphors a portion remains as tin oxide so that the total Ca+Sr+Sn actually present in phosphor is slightly under the stoichiometric value of 3.00.

Table 4

| Firing Temp. | Gram Atoms Per 2 Gram Moles PO$_4$ | | | Photometer Readings | | | |
|---|---|---|---|---|---|---|---|
| | Calcium | Strontium | Tin | Viscor | Red | Green | Blue |
| 2,000° F | 2.00 | 0.90 | 0.02 | 53 | 124 | 49 | 95 |
| 2,100° F | 2.00 | 0.90 | 0.02 | 49 | 115 | 46 | 90 |
| 2,200° F | 2.00 | 0.90 | 0.02 | 56 | 124 | 52 | 115 |

Table 4 shows the output of phosphors prepared with 2.00 gram-atoms of calcium, 0.90 gram-atom of strontium and 0.02 gram-atom of tin for each 2.00 gram moles of phosphate. These phosphors were prefired in air at 2200° F. and then refired at various temperatures in a controlled atmosphere to develop their fluorescent properties. The ambient atmosphere contained approximately 3% hydrogen with the balance being nitrogen. The output was substantially constant over a range of firing temperature between 2000° F. and 2200° F. Other tests have shown that satisfactory fluorescence can be developed by refiring at temperatures as low as 1600° F., if the time of firing is considerably increased. As the firing temperature is decreased, there is less tendency for the development of a gray discoloration and consequently the amount of hydrogen in the ambient atmosphere can be somewhat increased.

In the manufacture of these phosphors, I prefer to use a mixture of secondary calcium phosphate, secondary strontium phosphate, calcium carbonate, strontium carbonate and either stannous or stannic oxide—thus obtaining independent control of the amounts of calcium, strontium and tin in relation to the phosphate content of the mixture. While these are the preferred components, various substitutions are possible. For example, tricalcium phosphate and tristrontium phosphate may be used, but these compounds as normally made are somewhat variable in composition and may contain an excess or deficiency of phosphate, thus requiring the use of a calcium or strontium salt or a phosphate salt to bring the composition to the correct value. The reproducibility of the phosphor from batch to batch is poorer when the tricalcium or tristrontium phosphate is used. It is possible also to use the carbonates with ammonium phosphate as the sources of the metal ion and of phosphate. The calcium and strontium carbonate may also be replaced by other compounds which break down to form the oxide on heating. Other stannous or stannic compounds, which form oxides on heating, may be used or the tin may be introduced as a halide.

After the correct proportions of the various raw materials are mixed, either by ballmilling in acetone, by hammermilling, or by other suitable methods, the phosphors are fired in air at temperatures between 2000 and 2200° F. to eliminate combined water and carbon dioxide and to form the triorthophosphate matrix containing tin in solid solution in the stannic form. The resultant powder is substantially nonfluorescent.

After this prefiring operation, I mortar grind or hammermill the powder to break down any sintered aggregates and then refire for a short time in a controlled ambient atmosphere. Although I prefer this method of firing, it is also possible to obtain phosphors of substantially equal quality by omitting the prefiring operation and firing directly in the controlled atmosphere. With this single firing the time must be somewhat increased to insure the formation of the matrix and the reduction of the tin to the stannous condition.

The phosphors described in the previous tables were made by the use of strontium carbonate with dicalcium phosphate as raw materials. This choice of materials limits the amount of strontium to values below 0.95 gram-atom with the calcium content being 2.0 gram-atoms and the phosphate content being 2.0 gram moles. Substitution of secondary strontium phosphate for a part or all of the secondary calcium phosphate removes this limitation on composition and Tables 5 through 9 show the effect of a wider range composition of the output of the powders.

Table 5

| Gram Atoms per 2 Gram Moles PO$_4$ | | | Photometer Readings | | | |
|---|---|---|---|---|---|---|
| Calcium | Strontium | Tin | Viscor | Red | Green | Blue |
| 2.88 | 0.00 | 0.04 | 76 | 114 | 80 | 75 |
| 2.85 | 0.03 | 0.04 | 73 | 110 | 78 | 80 |
| 2.82 | 0.06 | 0.04 | 70 | 115 | 71 | 70 |
| 2.76 | 0.12 | 0.04 | 76 | 120 | 78 | 70 |
| 2.66 | 0.22 | 0.04 | 72 | 120 | 78 | 70 |
| 2.44 | 0.44 | 0.04 | 68 | 121 | 68 | 75 |
| 2.22 | 0.66 | 0.04 | 57 | 123 | 54 | 105 |
| 2.00 | 0.88 | 0.04 | 57 | 124 | 57 | 100 |
| 1.00 | 1.88 | 0.04 | 47 | 123 | 41 | 95 |

Table 5 shows the effect of varying calcium to strontium ratio for phosphors using phosphate and carbonate in such proportions as to maintain the sum of the calcium and strontium at 2.88 gram-atoms while holding the phosphate at 2.00 gram-moles. It will be seen that the red reading increases rather slowly, the blue reading increases somewhat more rapidly, while the green reading falls off, with the major change occurring in the range between 0.22 and 0.88 gram-atom of strontium.

Table 6

| Gram Atoms per 2 Gram Moles PO$_4$ | | | Photometer Readings | | | |
|---|---|---|---|---|---|---|
| Calcium | Strontium | Tin | Viscor | Red | Green | Blue |
| 2.80 | 0.00 | 0.02 | 68 | 106 | 72 | 75 |
| 1.60 | 1.20 | 0.02 | 46 | 111 | 43 | 50 |
| 1.20 | 1.60 | 0.02 | 45 | 112 | 39 | 95 |
| 0.80 | 2.00 | 0.02 | 45 | 117 | 43 | 75 |
| 0.60 | 2.20 | 0.02 | 42 | 119 | 41 | 60 |
| 0.40 | 2.40 | 0.02 | 40 | 115 | 39 | 76 |
| 0.20 | 2.60 | 0.02 | 35 | 83 | 33 | 80 |
| 0.10 | 2.70 | 0.02 | 20 | 57 | 16 | 120 |
| ------ | 2.80 | 0.02 | 0 | 8 | 0 | 150 |

Table 6 shows the effect of composition for phosphors using the mixture of secondary calcium phosphate and secondary strontium phosphate in which the total of calcium and strontium was held at 2.80 gram-atoms. It will be seen that the output is substantially constant in both the red, green, and blue readings, until the calcium content reaches 0.40 gram-atom. As the amount of calcium falls below this value, the output falls off very rapidly, especially in the red. Tin-activated tristrontium orthophosphate is essentially a U. V. emitting phosphor, which has, however, an emission spectrum sufficiently broad to give some visible radiation, thus accounting for the blue reading obtained.

Table 7

| Gram Atoms per 2 Gram Moles PO₄ | | | Photometer Readings | | | |
|---|---|---|---|---|---|---|
| Calcium | Strontium | Tin | Viscor | Red | Green | Blue |
| 2.70 | 0.00 | 0.04 | 71 | 122 | 69 | 60 |
| 2.00 | 0.70 | 0.04 | 54 | 114 | 50 | 80 |
| 1.80 | 0.90 | 0.02 | 51 | 116 | 49 | 95 |
| 1.20 | 1.50 | 0.02 | 48 | 115 | 41 | 110 |
| 1.00 | 1.70 | 0.02 | 46 | 115 | 41 | 110 |

Table 8

| Gram Atoms per 2 Gram Moles PO₄ | | | Photometer Readings | | | |
|---|---|---|---|---|---|---|
| Calcium | Strontium | Tin | Viscor | Red | Green | Blue |
| 2.50 | 0.00 | 0.04 | 66 | 108 | 70 | 45 |
| 2.00 | 0.50 | 0.04 | 53 | 100 | 51 | 80 |
| 1.60 | 0.90 | 0.02 | 51 | 101 | 48 | 95 |
| 1.00 | 1.50 | 0.02 | 46 | 110 | 41 | 110 |
| 0.50 | 2.00 | 0.02 | 41 | 105 | 35 | 85 |

Table 7 shows the output of phosphors in which the sum of the calcium and strontium was maintained at 2.70 gram-atoms, while Table 8 gives similar results with the sum being 2.50 gram-atoms. It will be seen that the output is only slightly lower than for phosphors listed in Tables 5 and 6.

Table 9

| Gram Atoms per 2 Gram Moles PO₄ | | | Photometer Readings | | | |
|---|---|---|---|---|---|---|
| Calcium | Strontium | Tin | Viscor | Red | Green | Blue |
| 2.30 | 0.00 | 0.04 | 46 | 84 | 46 | 35 |
| 2.00 | 0.30 | 0.04 | 48 | 88 | 50 | 80 |
| 1.40 | 0.90 | 0.02 | 50 | 88 | 48 | 95 |
| 1.00 | 1.30 | 0.02 | 41 | 91 | 40 | 110 |
| 0.80 | 1.50 | 0.02 | 42 | 92 | 38 | 115 |
| 0.30 | 2.00 | 0.02 | 35 | 91 | 32 | 60 |

Table 9 lists the output of phosphors in which the sum of calcium and strontium is held at 2.30. It will be seen that the output is appreciably lower than for phosphors in the preceding tables.

As the stoichiometric composition is approached, I have found that the exact composition of the phosphor is of great importance in obtaining good fluorescent materials. The stoichiometric amounts in a triorthphosphate are 3.00 gram-atoms of metal to each 2.00 gram-moles of phosphate. If this stoichiometric amount of 3.00 gram-atoms of metal ions is used, the fired powder is white but substantially non-fluorescent when a gas mixture low in hydrogen is used in firing, while with a gas mixture high in hydrogen the powders become dark gray, as well as non-fluorescent. This effect is the same regardless of the ratio of calcium to strontium.

Table 10

| Gram Atoms per 2 Gram Moles PO₄ | | | | Photometer Readings | | | |
|---|---|---|---|---|---|---|---|
| Calcium | Strontium | Tin | Ca+Sr | Viscor | Red | Green | Blue |
| 2.00 | .88 | .04 | 2.88 | 57 | 124 | 57 | 100 |
| 2.00 | .95 | .04 | 2.95 | 53 | 116 | 48 | 100 |
| 2.00 | .98 | .01 | 2.98 | 39 | 86 | 35 | 100 |
| 2.00 | 1.02 | .01 | 3.02 | 0 | 0 | 0 | 7 |

Table 10 shows the effect of a small variation of the metal ion to phosphate ratio for powders in which the calcium and phosphate are provided by the use of secondary calcium phosphate and the strontium is provided by the use of strontium carbonate. It will be seen that when the sum of calcium and strontium is below 2.95, the output is good, but if this sum is increased to 2.98, the output drops off rather seriously. With a further increase to 3.02, the output is practically zero, except for a trace of blue fluorescence.

As one example of my invention, I will describe the preparation of a phosphor containing 0.04 gram-atoms of tin per 2 gram-moles of phosphor. The following proportions of reagent grade chemicals were dry blended by rolling together in a glass jar, after which the mixture was hammermilled:

| | Moles | Grams |
|---|---|---|
| CaHPO₄ | 4.0 | 552.3 (containing 7 grams free H₂O). |
| SrCO₃ | 1.76 | 260.0. |
| SnO | 0.08 | 10.8. |

The hammermilled mixture was fired in an open silica crucible for 2 hours at 2200° F. After cooling, the resultant white non-fluorescent powder was hammermilled and then placed in porcelain boats for refiring in the controlled atmosphere.

The porcelain boat, containing the prefired powder, was placed inside a large silica tube and pushed to the closed end of this tube, the closure of which was effected by fusion. The open end of the tube was then sealed by a rubber stopper which had two small holes—one of them serving as a vent. A small diameter silica tube, extending over the boat to within ½ inch of the closed end of the large silica tube, was inserted through the other hole in the rubber stopper. The gas mixture, comprising 2% electrolytic hydrogen and 98% oxygen-free nitrogen, entered through this tube, flowed back through the outer tube and then out through the vent opening in the rubber stopper. After inserting the boat and sealing the silica tube with the rubber stopper, the assembly was flushed with the gas mixture for 10 minutes before firing started. The closed end of the silica tube, containing the porcelain boat, was inserted through an opening in the wall of a furnace heated to 2200° F., so that the whole length containing the boat was uniformly heated. After ½ hour in the furnace the assembly was withdrawn and cooled to about 500° F. before opening to withdraw the porcelain boat. The gas flow was maintained at a fixed rate during flushing, firing, and cooling. The fluorescent powder fired in this way had photometer readings as follows:

Viscor _____ 57
Red _____ 124
Green _____ 57
Blue _____ 100

The light emitted by phosphors prepared by the process of this invention contains a large amount of deep red light, comparable with that obtained from the calcium phosphate, tin activated. However, the tin activated tricalcium phosphate has a color approximating that of 3500° white when made into fluorescent lamps so that the warmer color white lamps, approximating 3000° in color temperature, can be made only by blending with other red phosphors. In contrast, the calcium strontium phosphates have a much more saturated color and can be blended with blue and green phosphors to give a lamp approximating 3000° color temperature and containing much more deep red light than can be obtained with any other previous combination of phosphors. This large content of deep red gives a better color rendition of objects when under the lamps, particularly of objects which reflect red light with a high degree of efficiency.

The calcium strontium phosphates have the further advantage, compared to most deep red phosphors, of being relatively insensitive to oxidation on exposure to air if the temperature is below 900° F. It is possible, therefore, to make lamps in the usual way by ballmilling the powder in a lacquer with a suitable cellulose compound, coating a bub, and baking out the carbonaceous matter by an application of a flame or a radiant heat, after which the electrodes are sealed in and the lamp made in the usual way.

What I claim is:

1. A tin-activated tri-calcium phosphate phosphor in which at least part of the calcium is replaced by strontium and in which the ratio of calcium plus-strontium to the phosphate radical is between about 2.98 and 2.30 and in which a substantial part of the tin is in the stannous state.

2. The combination of claim 1 in which the tin content lies between 0.002 and 0.20 gram atom for each 2.00 gram moles of phosphate.

References Cited in the file of this patent

UNITED STATES PATENTS

| | | |
|---|---|---|
| 2,306,567 | Roberts | Dec. 29, 1942 |
| 2,455,415 | Froelich | Dec. 7, 1948 |
| 2,512,270 | Froelich | June 20, 1950 |

FOREIGN PATENTS

| | | |
|---|---|---|
| 107,998 | Australia | July 13, 1939 |